March 9, 1965  A. W. QUICK ET AL  3,172,263
AUTOMATICALLY CONTROLLED DRIVE SYSTEM
Original Filed March 7, 1957  2 Sheets-Sheet 1

March 9, 1965   A. W. QUICK ET AL   3,172,263
AUTOMATICALLY CONTROLLED DRIVE SYSTEM
Original Filed March 7, 1957   2 Sheets-Sheet 2

Inventors:
August Wilhelm Quick
and Hans Lindemann
by
Michael S. Striker
Attorney

United States Patent Office 3,172,263
Patented Mar. 9, 1965

3,172,263
AUTOMATICALLY CONTROLLED DRIVE
SYSTEM
August Wilhelm Quick, Aachen, and Hans Lindemann, Bielefeld, Germany, assignors to Th. Calow & Co., Bielefeld, Germany
Original application Mar. 7, 1957, Ser. No. 644,516, now Patent No. 3,009,323, dated Nov. 21, 1961. Divided and this application Nov. 1, 1961, Ser. No. 149,371
Claims priority, application Germany, Mar. 28, 1956, C 12,802; Dec. 7, 1956, C 14,090; Feb. 4, 1957, C 14,342
9 Claims. (Cl. 60—54)

The present application is a divisional application of the copending application Quick et al. Serial No. 644,516, filed March 7, 1957, for "Driving Systems for Machine Tools," which issued on November 21, 1961, as U.S. Patent No. 3,009,323.

The present invention relates to an automatically controlled drive system, and more particularly to a drive system for maintaining a constant speed of a machine tool which is subjected to a variable load.

It is known to provide Ward-Leonard drives, infinitely variable polyphase induction motors or prime movers provided with an infinitely variable transmission for this purpose. However, the known apparatus for maintaining machines, such as machine tools, at constant speeds under a variable load, are either very expensive, or have a short span of life.

It is one object of the invention to overcome the disadvantages of known drive systems of this type, and to provide an automatically controlled drive system of simple construction, which can be inexpensively manufactured, but is capable of driving a machine at constant speed while the same is subjected to varying load torques.

The drive system of the invention is particularly suited for driving machine tools by which bars or tubes are skimmed since in machines of this type the speed of rotation, once it is set, should change as little as possible, although the feed and the cutting output may be changed. If a workpiece of a different diameter is to be finished, the speed of rotation must be set differently, however, the respective set speed must be maintained constantly during the operation.

Another object of the present invention is to provide a drive system which is automatically controlled to respond to even very slow accelerations or decelerations of the driven machine to adjust the drive torque corresponding with the variation of the load torque which caused the slow acceleration or deceleration.

Another object of the present invention is to provide a control device responsive to slow accelerations and decelerations only after the driven shaft has deviated a selected angle from its theoretical position it would have at a constant speed of rotation. Another object of the present invention is to provide a drive system including a device responsive to rapid acceleration above or below a selected range of accelerations and decelerations, and another device responsive to slow acceleration and deceleration within the above mentioned selected range of accelerations and deceleration.

Another object of the present invention is to provide in addition to the devices which respond to rapid and slow acceleration and deceleration, a further control device which responds to speed above or below a selected range of speeds, while the device which is responsive to slow accelerations and decelerations is effective to obtain an adjustment of the drive torque when the driven shaft accelerates or decelerates to speeds within the above mentioned selected speed range.

With these objects in view, a drive system according to one embodiment of the invention comprises drive means including rotary output means whose output torque can be adjusted. Preferably a prime mover, such as an electric motor, drives fluid impelling means which turbine means are driven, and the adjusting means act on the fluid impelling means.

A shaft is driven by the output means and drives a machine subjected to a variable load, such as a machine tool.

A control device is driven from the shaft and is responsive to rapid acceleration or deceleration above or below a select range of accelerations and decelerations to assume an actuated position, in which it, for example, closes a switch.

Another control device is driven from the shaft and is responsive to slow acceleration and deceleration of the shaft within the above mentioned selected range of accelerations and decelerations to assume an actuated position when slow accelerations and diagonal or decelerations effect an angular displacement of the shaft relative to the angular position of the shaft at constant speed. This device also closes a switch when arriving in the actuated position.

Preferably a further control device is driven from the shaft and is rsponsive to speeds above or below a selected range of speeds to assume an actuated position, in which it closes a third switch.

The device which is responsive to slow acceleration and deceleration will respond before the shaft reaches speeds above or below the selected speed range. Consequently, when the shaft slowly accelerates to speeds within the selected speed range, the respective control device will take corrective action if the slight speed increase or speed decrease prevails long enough to effect a sufficient angular displacement of the shaft relative to the angular position it would have if rotating at absolutely constant speed.

Each of the above mentioned control devices is operatively connected to the adjusting means by which the output torque of the output means of the drive means is adjusted. Consequently, when the speed of the shaft varies due to variations of the load torque, the output torque immediately varies to compensate the increased or decreased load torque, whereby an absolutely constant speed is maintained.

The control device which responds to rapid acceleration or deceleration, and the control device which responds to slow acceleration or deceleration both include a weight means which tends to rotate at constant speed due to its inertia. However, in the device which responds to rapid speed variations, a small angular displacement will result in actuation of the adjusting means, while in the device responsive to slow speed variations of the shaft, the angular displacement of the shaft from its theoretical correct position must be far greater, for example 160°.

In this manner, hunting of the device is prevented, and it is possible that slow accelerations and decelerations following each other compensate each other before this greater angular displacement is reached. Even very rapid accelerations will not actuate the device responsive to slow accelerations, if such rapid acceleration prevails for such a short time that the shaft is not displaced a sufficiently large angle from its theoretical position at constant speed.

Electric operating means are energized when switches are closed by each of the control devices in actuated position, and effect through suitable linkages the operation of the adjusting means for the drive system. For example, a valve may be operated to reduce or increase the cross section of a nozzle through which a liquid is projected at a turbine wheel.

If a torque converter including an impeller wheel and a turbine wheel is used, the blades of the impeller wheel are turned to adjust the output torque of the turbine.

Although turbine type drive means have an output torque which rapidly drops upon an increase of the rotary speed, the automatic control system of the present invention is capable of maintaining a turbine type drive at constant speed even if the load is substantially smaller than the full capacity of the hydraulic drive system.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
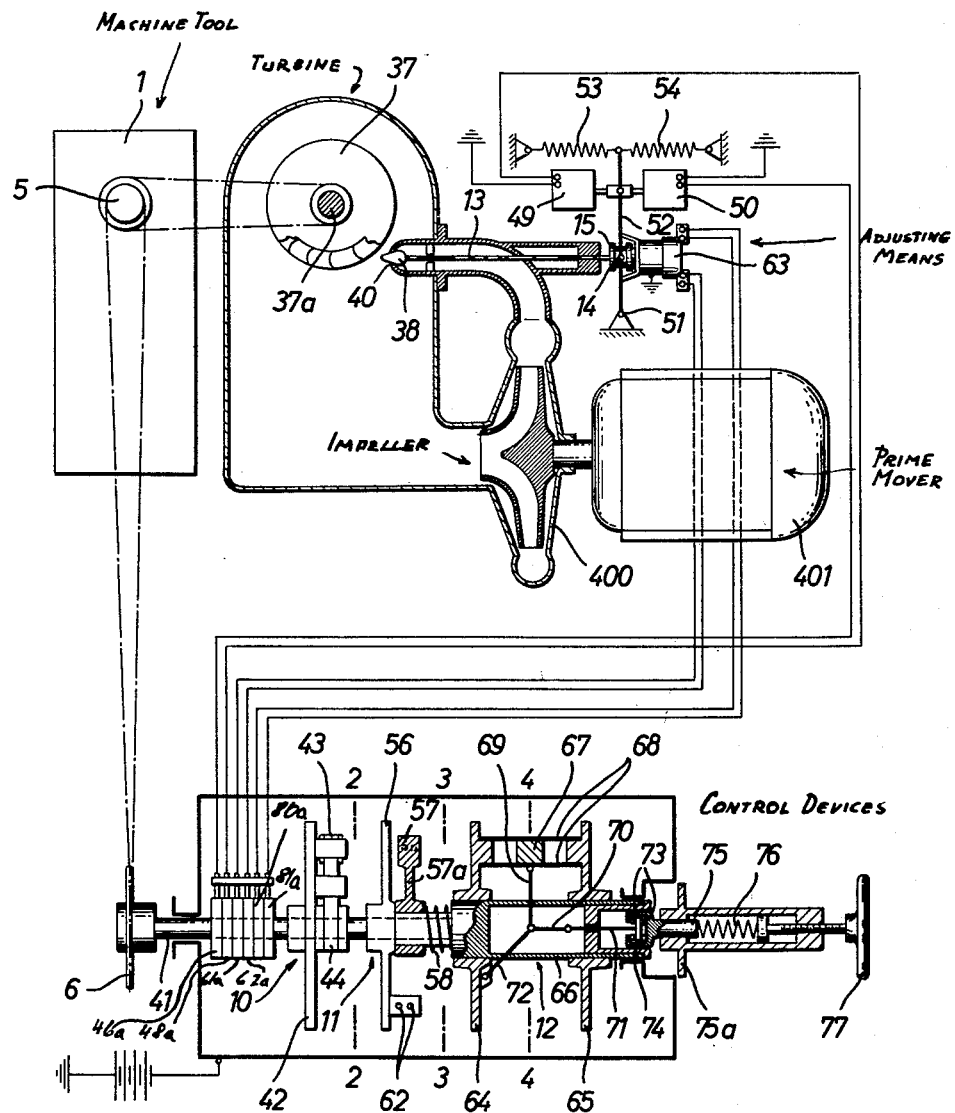
FIG. 1 is a schematic view, partly in section, illustrating a drive system and control means for adjusting the output torque of the drive system according to one embodiment of the invention.

Referring now to the drawings, shaft 37a of a turbine wheel 37 drives through a shaft 5 a machine tool 1. A chain drive 6 connects shaft 5 to a control shaft 41 on which three control devices are mounted. The control device 10 is responsive to rapid accelerations and decelerations, the control device 11 is responsive to slow accelerations and decelerations, and control device 12 is responsive to speeds above or below a selected range of speeds.

Figure 2:
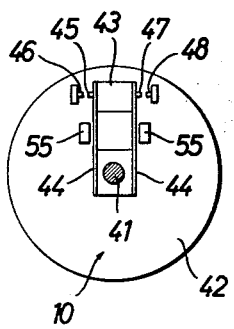
FIG. 2 is a sectional view taken on line 2—2 in FIG. 1.

As best seen in FIG. 2, the control device 10 includes a rotary member 42 which is fixed on shaft 41, a resilient arm including a pair of leaf springs 44, and a weight connecting the free ends of the leaf springs 44. A block 40 connects the inner end of leaf springs 44 and is secured to shaft 41 for rotation therewith. Two first contacts 46 are mounted on disc 42 and cooperate with two second contacts 45 and 47 which are secured to springs 44. The angular displacement of springs 44 is limited by a pair of stops 55 secured to disc 42. When shaft 41 rotates at constant speed, the resilient arm will rotate at the same speed as disc 42, and contacts 45, 47 will remain spaced from contacts 46, 48 as shown in FIG. 2. When shaft 41 is rapidly accelerated, disc 42 with contact 46 and 48 will also be accelerated. The inner end of the resilient arm will turn at the same speed as shaft 41 but the free end of the arm will tend to rotate at constant speed, and due to the inertia of weight 43, the outer end of the resilient arm will lag if shaft 41 and disc 42 are accelerated, so that contact 46 will engage contact 5 if the direction of rotation is assumed to be clockwise. If the shaft is decelerated, weight 43 will tend to rotate at constant speed so that shaft 41 and disc 42 will lag behind weight 43, and contact 48 will engage contact 47.

Only a very small relative angular displacement between the contacts is necessary to obtain closing of one or the other contacts so that the device immediately responds if rapid speed variations take place. However, the resiliency of springs 44 is selected in such a manner that very slow and gradual accelerations will be transmitted through springs 44 to weight 43 so that the weight 43 will also be gradually accelerated, or decelerated, to move at the same speed as disc 42, so that contacts 45, 47 will not engage contact 46, 48.

If the control device 10 would have weak springs, the device would respond to the slightest accelerations and decelerations so that the springs 44 would almost vibrate or oscillate and effect alternate engagement between contacts 44, 46 and contacts 47, 48 particularly due to the very small angular displacement which is required for obtaining engagement between the contacts. Therefore, the control device 10 will respond only to accelerations above a selected range of speed variations, but will respond very rapidly to such higher accelerations and decelerations. In this manner, "hunting" of the contacts which would damage the device in a short time, is prevented as is clearly shown in FIG. 2, the angle of relative displacement required for response of the device is only a few degrees. If such angle would be made substantially greater, the response of the device to rapid speed variations of shaft 41 would be much slower, but on the other hand, springs 44 must be sufficiently strong to prevent incessant operation of the device when very small speed variations take place.

As shown in FIG. 1, a turbine wheel 37 on shaft 37a is driven by a stream of liquid projected by a nozzle 40 against the blades of turbine wheel 37. The liquid is supplied by a pump 400 driven by a prime mover 401, shown to be a motor. A valve 38 is located in nozzle 40 and connected by a spindle rod 13 to a control lever 52 which is pivotally mounted at 51, and has a slide part 14 sliding in a circumferential groove of a flanged nut 15 which is driven by the shaft of motor 63. When motor 63 turns in one or the other direction nut 15 advances or retracts valve 38. However, since motor 63 is mounted on control lever 52, angular displacement of control lever 52 about pivot 51 will also displace valve 38 with motor 63.

Control lever 52 is connected to the armatures of a pair of electromagnetic means 49 and 50 which are respectively connected into the circuit of contacts 45, 46, and contacts 47, 48. Contacts 46 and 48 are connected to slide rings 46a, 48a whose brushes are connected with terminals of electromagnetic means 49, 50 whose other terminals are grounded. Contacts 45 and 47 are connected to a voltage source. The end of control lever 52 is connected by springs 53 and 54 to fixed points so that control lever 52 tends to assume a normal neutral position in which valve 38 is located in such a manner as to obtain the average torque required for driving the machine tool 1 at constant speed.

When either contact 45 engages contact 46, or contacts engages contact 48, electromagnetic means 49, or electromagnetic means 50, will be energized, and turn control lever 52 to displace valve 38 through connecting rod 13 so that the output torque of the output turbine means 37 is increased if an increased load on shaft 5 has caused rapid deceleration of shaft 41, while the output torque of shaft 37a is reduced if a lower load on shaft 5 has caused acceleration of shaft 41.

Control device 11 is responsive to small and gradual speed variations of shaft 41 to which control device 10 will not respond. A disc 56 is secured to shaft 41, and a weight 57 is secured to a rigid arm 57a which has a hub turnably mounted on a portion of shaft 41. A weak coil spring 58 has one end secured to the hub of arm 57a, and the other end secured to shaft 41, or, as shown in FIG. 1, to a member 64 which is fixed on shaft 41.

A pair of contacts 59 and 60 is secured to the outer faces of weight 57 and cooperates with a pair of contacts 61 and 62 which are secured to the rotary disc 56. When shaft 41 is accelerated or decelerated, disc 56 with contacts 61 and 62 will be displaced, while arm 57a will tend to rotate at constant speed due to the inertia of weight 57. Since the resiliency of spring 58 is very small, the relative displacement between arm 57 and disc 56 will not only take place at rapid accelerations and decelerations, but also at very small and gradual accelerations and decelerations.

Figure 3:
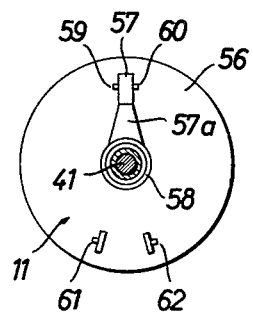
FIG. 3 is a sectional view taken on line 3—3 in FIG. 1.

As compared with the control device 10, contacts 59 and 61, on the one hand and contacts 60 and 62 on the other hand are not spaced a small angle, but a very large angle between 90° and 180°, and, as shown in FIG. 3, preferably 160°. Consequently, if rapid acceleration or deceleration takes place, one of the contacts of control device 10 will have closed long before the contacts of control device 11 could close, and consequently control device 3 will only respond to rapid accelerations and decelerations if the same continue in spite of the adjustment effected by the control device 10 through electromagnetic means 49 and 50. Since this is not possible, control device 11 will not effect an adjustment when rapid speed variations take place.

However, when a very slow and gradual speed variation occurs, to which control device 10 will not respond due to the strong springs 44, the weak spring 58 will permit a relative angular displacement between weight 57 which rotates at constant speed due to its inertia, and the gradually accelerated or decelerated rotary member 56. If contacts 60 and 62 and 59 and 61, respectively, were spaced from each other the same small angle as the contacts of control device 10 control device 11 would have all the disadvantages of control device 10 with a weak spring, namely continuous hunting. Due to the great angle between the contacts of control device 11 a slow and gradual speed variation will not cause a response of control device 11. A small acceleration may take place to a slightly higher speed, and be followed immediately by slow deceleration back to a normal speed, and if such slow speed variations take place only for a short period of time, the acceleration may have displaced the contacts of control device 11 for 45°, and then returned the contacts to the normal position illustrated in FIG. 3, so that the device will not respond. On the other hand, if a gradual acceleration effects a relative displacement of the contacts of device 11 through 45°, the device will also not respond, and the shaft 5 will rotate angularly displaced 45° with respect to its theoretical correct angular position at absolutely constant speed. If after awhile, or immediately, further gradual acceleration of shaft 5 and shaft 41 takes place, and if such accelerations add up to an angular displacement between weight 57 and rotary member 56 corresponding to the angular spacing of contacts 60 and 62, or contacts 59 and 61, control device 11 will respond.

It is therefore apparent that control device 11 is responsive to slow and gradual accelerations, but will respond to slow and gradual decelerations only if the controlled shaft has deviated from its theoretical correct position at absolutely constant speed a comparatively great angle which is no longer tolerable, but which is sufficiently great to prevent a constant hunting of a control device which is responsive to very slow and gradual accelerations.

Contacts 59, 61 and 60, 62 are connected to motor 63. Contacts 61, 62 are connected to slide rings 61a, 62a whose brushes are connected to terminals 63a of motor 63. Contacts 59, 60 are connected to a voltage source. When any pair of contacts 59, 61 or 60, 62 engage each other, motor 63 is energized and rotates in one or the other direction to displace nut 15 and to adjust the position of nozzle 38 by which the output torque of the output means 37 is adjusted corresponding to the load variation which caused the slow speed variation of shaft 41.

The third control device 12 includes two rotary disk members 64 and 65 which are fixed to a sleeve 66. A weight 57 is mounted between discs 64 and 65 by means of a pair of leaf springs 68, and is articulated to one end of a link 69 whose other end is articulated to a link 72 connected to a member 64, and to a link 70 articulated to a rod 71 which carries an end plate 74. A non-rotatable member 75 has an end portion with a pair of ball bearings in which plate 74 runs. Consequently members 64 and 65 can rotate together with members 69 to 72, and 74, while member 75 is movable in axial direction in a housing 75a. A spring 76 is connected to member 75 and to the threaded spindle of a handwheel 77 by which the tension of spring 76 can be adjusted.

Figure 4:
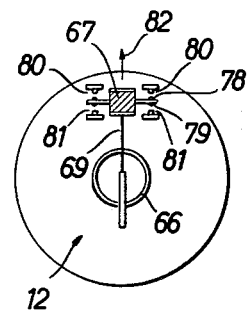
FIG. 4 is a sectional view taken on line 4—4 in FIG. 1.

As best seen in FIG. 4, weight 67 carries a pair of contacts 78 and a pair of contacts 79 which are located between pairs of contacts 80, 81.

When shaft 41 rotates at normal speed, the contacts are spaced from each other, but if the speed of shaft 41 increases or decreases to a speed above, or below, respectively, a selected speed range, weight 67 is either outwardly displaced by the centrifugal force, or is inwardly retracted by the force of spring 76. Such radial displacement of weight 67 will effect closing of contacts 78, 80, or of contacts 79, 81. Each pair of contacts is connected to motor 63, or to a corresponding motor, which is reversible to shift valve 38 through nuts 15 and connecting rod 13 so that the torque of the output turbine wheel 37 is adjusted if the speed of the controlled machine exceeds, or is below, a selected speed range. In the illustrated embodiment, contacts 80 and 81 are connected to slide rings 80a, 81a whose brushes are connected to terminals 63b of motor 63. Contacts 78, 79 are connected to a voltage source. Depending on whether contacts 80 or 81 are engaged by contacts 78, 79, motor 63 will rotate in one or the other direction of rotation to effect adjustment of valve 38. Control device 12 will not respond if the rotary speed of shaft 41 is only slightly increased or decreased, remaining in the above mentioned speed range. However, such slightly increased, or decreased, speeds of shaft 6 will effect a relative movement between arm 57a and member 56 of control device 11, and if a slightly increased, or decreased speed is maintained for a sufficiently long time to effect an advance or lag, of shaft 41 and member 56 through an angle of about 160° relative to the theoretical correct position at exactly constant speed, then control device 11 will respond.

Consequently, control device 11 will be responsive to higher or lower speeds to which the control device 12 will not respond. If control device 12 will be provided with a spring 76 of such weakness as to respond to all minor speed variations, continuous hunting of device 12 would take place, which is, of course, undesirable. Device 11, however, is not subject to such a hunting because its contacts are not spaced a small distance, as contacts of device 12, so that an increase, or decrease, of speed will only cause a response of control device 11 if persisting for a sufficiently long time to effect an angular displacement of shaft 41 from its theoretical correct position through a comparatively great angle. If a slightly increased speed due to a very slow and gradual acceleration persists only for a short time, then neither control device 11, nor control device 12 will respond, since the effect is negligible, and hunting of the contacts must be prevented. If a very small speed persists for such a long time that the angular displacement of shaft 41 relative to its correct position would become noticeable and detrimental, then control device 11 will effect the necessary adjustment of the output torque.

Figure 5:
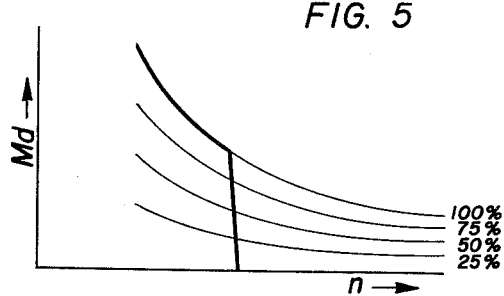
FIG. 5 is a diagram illustrating the torque obtained by the drive system of the invention at different loads.

FIG. 5 shows the output torque Md dependent on the rotary speed n. The several graphs are indicated to show the torque variations for torques having 100%, 75%, 50%, and 25%, respectively, of the turbine-type drive system, for example of a torque converter. The thin line indicates the conditions for the uncontrolled drive means, while the heavy line indicates the torque conditions when the drive means is controlled by control devices 10, 11 and 12. It will be seen that a straight characteristic indicating almost constant speed results, regardless of whether the turbine-type drive system is used to full capacity, or only to a fraction of its capacity. The same constant speed can be maintained up to a certain maximum torque.

When the machine is started, shaft 41 will be accelerated, and all control devices will be effective to increase the output torque. When the desired speed is obtained, the control devices will be in the inoperative positions illustrated in the drawing. When machine tool 1 encounters strong resistance, shaft 41 will be rapidly decelerated, and control device 10 will be actuated to adjust the position of valve 38, and thereby the output torque of the turbine so that a greater output torque is provided for the greater load torque and the machine returns to its desired speed. If at any time during operation shaft 5 rotates at a speed greater or smaller than the selected speed range, the device 12 will effect adjustment of the nozzle 38 so that the output torque is correspondingly adjusted to obtain equilibrium with the load torque.

When the speed variations are so gradual and slow that the control device 10 does not respond, and result in speed within the range to which speed-responsive device 12 does not respond, control device 11 will be actuated. If such small speed variation persists sufficiently long, a relative displacement of 160° between the actual angular position of shaft 41 and its theoretical position at constant speed as represented by the position of weight 57 will take place, so that device 11 will respond, and effect adjustment of valve 38, and thereby of the output torque.

It will be understood that each of the elements described above or two or more together, may also find a useful application in other types of automatically controlled drive systems differing from the types described above.

While the invention has been illustrated and described as embodied in a drive system controlled by a first control device responsive to speed above or below a selected range of speeds, a second control device responsive to rapid acceleration or deceleration, and a third control device which responds when the output shaft has deviated a comparatively great angle from its angular position it would have at constant speed, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A drive system comprising, in combination, drive means including rotary output means, and adjusting means for adjusting the output torque of said output means; a shaft driven by said output means and adapted to drive a machine subjected to a variable load; a first device driven from said shaft and being responsive to rapid acceleration or deceleration above or below a selected range of accelerations and decelerations to assume an actuated position when rapid acceleration or deceleration effects an angular displacement of said shaft relative to the angular positions of said shaft at constant speed for a first selected small angle; and a second device driven from said shaft and being responsive to slow acceleration or deceleration of said shaft within said selected range of accelerations and decelerations to assume an actuated position when slow accelerations or decelerations effect a substantial angular displacement of said shaft relative to the angular position of said shaft at constant speed for a second angle substantially greater than said first angle so that acceleration or deceleration prevailing for a short time and effecting an angular displacement of said shaft smaller than said second angle will not cause said second device to assume said actuated position thereof, each of said devices being operatively connected to said adjusting means for controlling the same in said actuated position to effect an adjustment of said output means so that the output torque is rapidly increased or decreased when the speed of said shaft varies due to load variations.

2. A drive system comprising, in combination, prime mover means; drive means including fluid impelling means driven by said prime mover means, turbine means having rotary output means, and adjusting means for adjusting the output torque of said output means; a shaft driven by said output means and adapted to drive a machine subjected to a variable load; a first device driven from said shaft and being responsive to speeds above or below a selected range of speeds to assume an actuated position; a second device driven from said shaft and being responsive to rapid acceleration or deceleration above or below a selected range of accelerations and decelerations to assume an actuated position when rapid acceleration or deceleration effects an angular displacement of said shaft relative to the angular positions of said shaft at constant speed for a first selected small angle; and a third device driven from said shaft and being responsive to slow acceleration or deceleration of said shaft within said selected range of accelerations and decelerations to speeds within said selected speed range to assume an actuated position when slow accelerations or decelerations effect a substantial angular displacement of said shaft relative to the angular position of said shaft at constant speed for a second angle substantially greater than said first angle so that acceleration or deceleration prevailing for a short time and effecting an angular displacement of said shaft smaller than said second angle will not cause said third drive to assume said actuated position thereof, each of said devices being operatively connected to said adjusting means for controlling the same in said actuated position to effect an adjustment of said output means so that the output torque is rapidly increased or decreased when the speed of said shaft varies due to load variations.

3. A drive system comprising, in combination, prime mover means; drive means including fluid impelling means driven by said prime mover means, turbine means having rotary output means, and adjusting means for adjusting the output torque of said output means; a shaft driven by said output means and adapted to drive a machine subjected to a variable load; a first device driven from said shaft and being responsive to speeds above or below a selected range of speeds to assume an actuated position; a second device driven from said shaft and being responsive to rapid acceleration or deceleration above or below a selected range of accelerations and decelerations to assume an actuated position when rapid acceleration or deceleration effects an angular displacement of said shaft relative to the angular positions of said shaft at constant speed for a first selected small angle; and a third device driven from said shaft and being responsive to slow acceleration or deceleration of said shaft within said selected range of accelerations and decelerations to speeds within said selected speed range to assume an actuated position when slow accelerations or decelerations effect a substantial angular displacement of said shaft relative to the angular position of said shaft at constant speed for a second angle substantially greater than said first angle so that acceleration or deceleration prevailing for a short time and effecting an angular displacement of said shaft smaller than said second angle will not cause said third device to assume said actuated position thereof, each of said devices including a switch closed in said actuated position of the respective device; a control means connected to said adjusting means for operating the same, said control means including electric operating means electrically connected with said switches so that said control means controls said adjusting means to effect an adjustment of said output means when any of said devices assumes said actuated position so that the output torque is rapidly increased or decreased when the speed of said shaft varies due to load variations.

4. A drive system as set forth in claim 3 wherein said first device includes a rotary member connected to the shaft for rotation therewith, a spring-loaded centrifugal weight mounted on said rotary member for radial movement in accordance with the rotary speed of said output means, a pair of contact means constituting said switch and being spaced from each other in radial direction so as to be closed, respectively, in two radially spaced positions of said centrifugal weight respectively associated with speeds above or below said selected range of speeds, and wherein said electric operating means of said control means is electrically connected to said contact means to actuate said control means when one of said contact means closes.

5. A drive system as set forth in claim 4 wherein said electric operating means is a motor adapted to rotate in opposite directions when one or the other of said contact means, respectively, is closed, and wherein said control means includes means displaced in opposite directions upon rotation of said motor in opposite directions, and connected to said adjusting means.

6. A drive system as set forth in claim 3 wherein said second device includes a rotary member connected to said shaft for rotation therewith, a pair of first contacts mounted on said member radially spaced from the axis of rotation of said rotary member, and spaced from each other in a direction transverse to said radial direction, a resilient arm having one end connected to said shaft for rotation therewith, and a free end carrying a pair of second contacts respectively located between and cooperating with said pair of first contacts, said resilient arm having at said free end thereof a weight means and tending to remain in a position in which said second contacts are spaced from said first contacts so that upon rapid acceleration and deceleration of said shaft and rotary member, a first contact engages the corresponding second contact due to the inertia of said weight means which tends to rotate at constant speed and bends said resilient arm, said first and second contacts constituting said switch and being respectively connected to said electric operating means.

7. A drive system as set forth in claim 6 wherein said electric operating means include a pair of electromagnetic operating means, said electromagnetic operating means respectively connected to a pair of first and second contacts so as to be energized when the respective pair of contacts closes; said control means including a control member, and a pair of springs connected to said control member and tending to hold the same in a central position, said electromagnetic means being both connected to said control member so that said control member is displaced in opposite directions, respectively, when one or the other of said electromagnetic operating means is energized, said control member being connected to said adjusting means for rotating the same.

8. A drive system as set forth in claim 3 wherein said third device includes a rotary member connected to said shaft for rotation therewith, a pair of contacts secured to said rotary member and having contact faces angularly spaced from each other, an arm turnably mounted at one end thereof on said shaft and having a weight on the other end thereof, a pair of second contacts located in opposite sides of said other end of said arm and between said first mentioned contacts, spring means connecting said one end of said arm with said shaft so that when said shaft is accelerated within said selected range of accelerations and decelerations said rotary member and said first mentioned contacts move relative to said arm and said second contact since said arm tends to remain at constant speed due to the inertia of said weight means while gradually tensioning said spring whereby after a substantial angular displacement of said shaft and rotary member relative to said arm, one or the other of said first mentioned contacts engages the corresponding second contact, said first and second contacts constituting said switch and being connected to said electric operating means for energizing the same when one of said first mentioned contacts engages one of said second contacts.

9. A drive system comprising, in combination, drive means including rotary output means, and adjusting means for adjusting the output torque of said output means; a shaft driven by said output means and adapted to drive a machine subjected to a variable load; a first device driven from said shaft and being responsive to rapid acceleration or deceleration above or below a selected range of accelerations and decelerations to assume an actuated position when rapid acceleration or deceleration effects an angular displacement of said shaft relative to the angular positions of said shaft at constant speed for a first selected small angle; and a second device driven from said shaft and being responsive to slow acceleration or deceleration of said shaft to assume an actuated position when slow accelerations or decelerations effect a substantial angular displacement of said shaft relative to the angular position of said shaft at constant speed for a second angle substantially greater than said first angle and being in either direction of rotation greater than 90° and smaller than 180° so that acceleration or deceleration prevailing for a short time and effecting an angular displacement of said shaft smaller than said second angle will not cause said second device to assume said actuated position thereof, each of said devices being operatively connected to said adjusting means for controlling the same in said actuated position to effect an adjustment of said output means so that the output torque is rapidly increased or decreased when the speed of said shaft varies due to load variations.

References Cited by the Examiner

UNITED STATES PATENTS

| | | | |
|---|---|---|---|
| 2,291,011 | 7/42 | Vickers | 60—53 |
| 2,382,034 | 8/45 | Wemp | 60—54 |
| 2,492,720 | 12/49 | Tyler | 60—53 |
| 2,505,727 | 4/50 | Vickers et al. | 60—53 X |
| 2,739,447 | 3/56 | Newell | 60—53 |
| 2,768,636 | 10/56 | Postel et al. | 60—53 X |
| 2,805,549 | 9/57 | Hensleigh et al. | 60—54 |

JULIUS E. WEST, *Primary Examiner.*